United States Patent
Wooters

[15] 3,661,430
[45] May 9, 1972

[54] BRAKE FOR A TRACK VEHICLE

[72] Inventor: Eldon W. Wooters, Lincoln, Nebr.

[73] Assignee: Outboard Marine Corporation, Waukegan, Ill.

[22] Filed: June 12, 1970

[21] Appl. No.: 45,617

[52] U.S. Cl. .................................. 305/9, 180/6.7, 188/31
[51] Int. Cl. ........................................... B62d 55/00
[58] Field of Search ............... 305/9; 180/6.7; 188/31, 29, 188/69; 280/28.5; 74/216.5

[56] References Cited

UNITED STATES PATENTS

| | | | |
|---|---|---|---|
| 1,752,395 | 4/1930 | Richardson | 305/9 X |
| 1,292,078 | 1/1929 | Ruane | 188/31 X |
| 3,088,531 | 5/1963 | Garrett et al. | 305/9 X |
| 1,890,728 | 12/1932 | Fundom | 180/6.7 UX |
| 1,069,761 | 8/1913 | Buckley | 280/28.5 UX |

FOREIGN PATENTS OR APPLICATIONS

| | | | |
|---|---|---|---|
| 887,224 | 11/1943 | France | 180/6.7 |
| 118,771 | 8/1958 | U.S.S.R. | 305/9 |

Primary Examiner—Benjamin Hersh
Assistant Examiner—John A. Pekar
Attorney—Spencer B. Michael, Robert K. Gerling, Robert E. Clemency, John W. Michael, Gerrit D. Foster, Bayard H. Michael, Paul R. Puerner, Joseph A. Gemignani and Andrew O. Riteris

[57] ABSTRACT

Disclosed herein is a vehicle including a track trained, in part, about a support mounted on a frame, and a brake shoe movable relative to a braking position in opposing relation to said support, and with said track between said support and said shoe, together with means on said frame for moving said brake shoe to and from said braking position.

8 Claims, 3 Drawing Figures

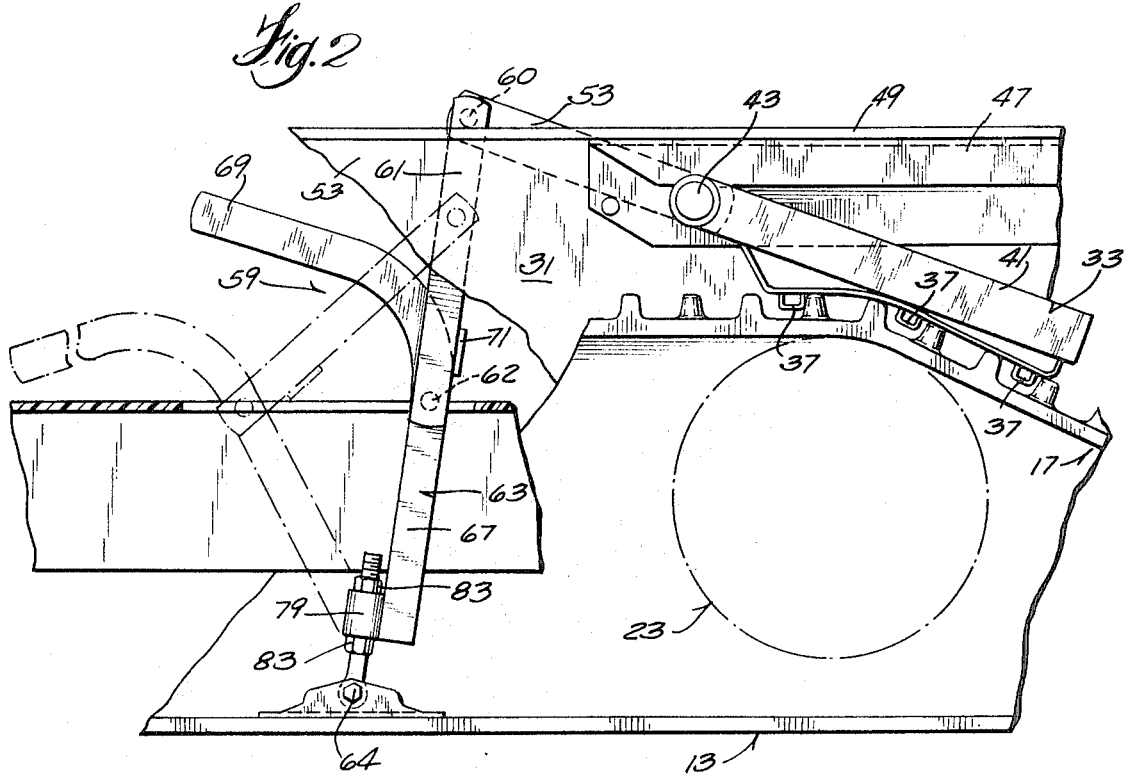
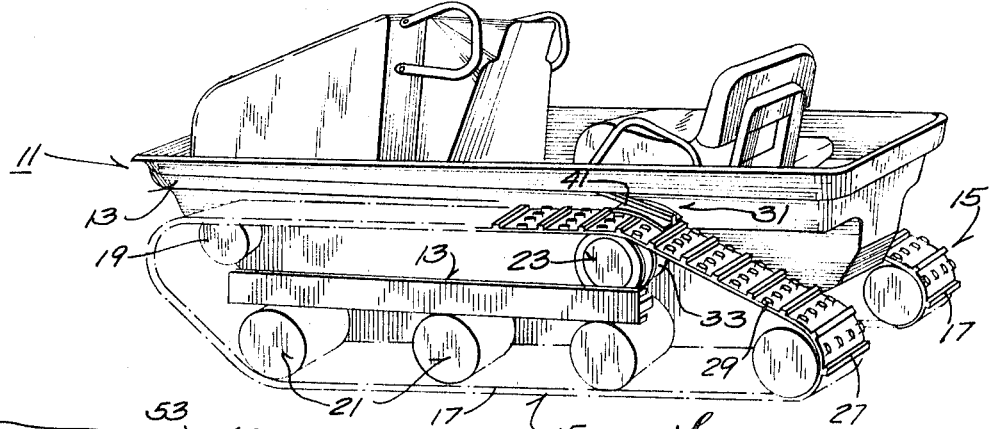
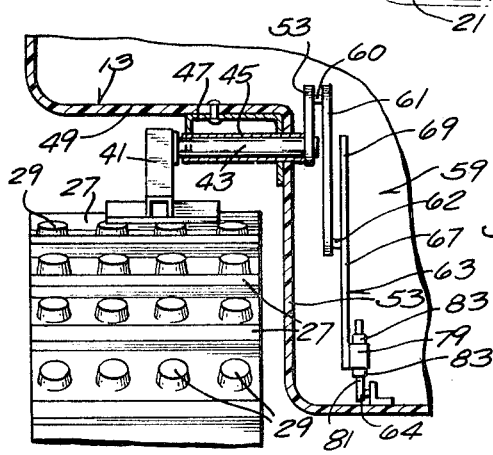
Inventor
Eldon W. Wooters
By
Wheeler, Wheeler, House & Clemency
Attorneys

BRAKE FOR A TRACK VEHICLE

BACKGROUND OF THE INVENTION

In the past several years various all-terrain vehicles have been developed. At least some such vehicles, as for instance the vehicle disclosed in the Jespersen U.S. application Ser. No. 857,494 filed Sept. 12, 1969, are well adapted to climb up and travel down and along the side of relatively steep slopes. In such a vehicle, it is desirable, and particularly if there is any possibility of drive train failure, to prevent, independently of the drive train, unwanted travel of the vehicle, as for instance, down a slope or otherwise.

SUMMARY OF THE INVENTION

The invention provides a brake for one track of a vehicle to prevent unwanted movement of the track and thereby to prevent unwanted vehicle movement. In accordance with the invention, linkage means are provided for moving the brake to and from a braking position and braking action is provided by interfering engagement between corrugations or other surface irregularities on the brake shoe and lugs, buttons or other surface irregularities on the track to prevent longitudinal movement of the track relative to the brake shoe. The invention relies primarily on interference with movement of the belt or track by the brake shoe. Any frictional braking resulting from conventional normal forces is secondary.

The linkage means for moving the brake shoe toward and away from its braking position includes adjustable means for adjustably locating the braking position relative to the track and its support.

Also in accordance with the invention, a brake is provided for only one of the tracks of a two-track vehicle as when one track is braked and the other track is unbraked, if there is movement of the unbraked track, such movement will turn the vehicle to present one of the vehicle sides to the slope and thereby prevent any tendency to travel down the slop. Braking of only one of the tracks, and the consequent tendency to turn sidewise, avoids the possibility of the vehicle tipping end over end if longitudinal movement of both tracks is prevented.

One of the principal objects of the invention is to provide a brake, independently of the drive train, for one track of a two track vehicle.

Another principal object of the invention is to provide a brake affording braking action by interfering engagement between surface irregularities on a brake shoe and on a track.

Another object of the invention is to provide a brake arrangement for a track vehicle, which arrangement is simple and relatively economical to manufacture, and which will provide reliable operation over a long and useful life.

Other objects and advantages of the invention will become known by reference to the following description and accompanying drawings in which:

DRAWINGS

FIG. 1 is a perspective view of a vehicle embodying various of the features of the invention.

FIG. 2 is an enlarged fragmentary elevational view illustrating the braking arrangement incorporated in the vehicle shown in FIG. 1.

FIG. 3 is an enlarged fragmentary end view, partly in section, also illustrating the braking arrangement incorporated in the vehicle shown in FIG. 1.

GENERAL DESCRIPTION

Shown in the drawings is a vehicle 11 which embodies various of the features of the invention and which is otherwise in general accordance with the disclosure of U.S. application Ser. No. 857,494, filed by Herbert A. Jespersen on Sept. 12, 1969. The vehicle includes a frame or housing 13 supported on each side by a pair of ground engaging endless track assemblies 15, each of which includes an endless track or belt 17 supported by and driven by suitable means including a drive sprocket 19, a plurality of movably mounted bogies 21 and an idler wheel 23.

Except as noted herein, the details of the construction of the frame 11 and of the endless track assemblies 15 are not a part of the invention and will not otherwise be described in detail. It should, however, be mentioned that the idler wheels 23 and the sprockets 19 are each mounted from the frame 13 for rotation about respectively fixed axes. In addition, it should be noted that each belt 17 includes transversely arranged members in the form of longitudinally spaced transversely extending lugs 27 and a transverse series of buttons 29 located in transversely spaced relation to each other and in longitudinally spaced relation from adjacent transverse lugs 27. The belt can include various systems of transversely arranged members for providing traction and for cooperation with the brake as will be described in greater detail.

In accordance with the invention, means 31 are provided for selectively braking one of the belts or tracks 17 against longitudinal movement. While various constructions can be employed, in the disclosed construction, such brake means includes a brake shoe 33 mounted from the frame 13 for movement relative to a braking position in opposing relation to a track support with the track located between the brake shoe 33 and the track support. The brake means 31 also includes means on the frame for moving the brake shoe 33 to and from the braking position.

Various track supports can be employed, for instance, a track supporting plate under a lengthwise run could be employed. In addition, either the sprocket or the idler wheel can be employed as the track support. In the disclosed construction, it is preferred to use the idler wheel 23 as the track support.

In view of the cooperation between the brake shoe 33 and the idler wheel 23, it is preferred that the brake shoe 33 be arcuately formed so that it will overlay a portion of the idler wheel 23 with the track 17 captured therebetween.

In accordance with the invention, means are provided on the track shoe 33 and on the track or belt 17 for interfitting engagement to prevent lengthwise track movement when the brake shoe 33 is in the braking position. While various arrangements can be employed, in the disclosed construction such means includes the before-mentioned transverse lugs 27 and buttons 29 on the track 17 and a series of transverse ribs or corrugations 37 which are spaced on the brake shoe 33 so as to be received in the voids between the buttons 29 and the lugs 27 when the brake shoe 33 is in its braking position, whereby to interfere with the lengthwise movement of the track or belt 17. Thus, belt movement is prevented when the brake shoe 33 is in braking position by interfering engagement of the brake shoe 33 with the belt 17. The friction developed by the normal forces acting between the belt 17 and the brake shoe 33 and/or between the belt 17 and the idler wheel 23 are secondary.

Various arrangements can be employed for supporting the brake shoe 33 from the vehicle frame 13 for movement relative to the brake position and for displacing the brake shoe toward and away from its braking position. In the illustrated construction, the brake shoe 33 is carried by a channel member 41 which, at one end, is fixed to a shaft 43 (see FIG. 3) extending pivotally through a bushing 45 supported transversely of the vehicle by another channel shaped member 47 fixed to the underside of the vehicle deck 49 and to the outside of the adjacent vertical body or frame wall portion 53. In the disclosed construction, the shaft 43 passes through the adjacent vertical wall portion 53 of the body or frame 13 and into the interior of the vehicle 11. At its inner end, the shaft 43 is fixed to an arm or crank 53 which extends in the opposite direction from the channel member 41 supporting the brake shoe 33.

Forming a part of a means for moving the brake shoe 33 to and from the brake position is a linkage 59 which is pivotally connected to the outer end of the crank 53 and which includes a link 61 pivoted at one end at 60 to the outer end of the crank 53. At its other end, the link 61 is pivoted at 62 to an intermediate portion of a lever 63 which, in turn, is pivotally mounted on the frame 13 at 64.

The lever 63 includes a link part 67 and a handle part 69 which extends at an angle to the link part 67. The lever 63 is pivotally connected to the link 61 adjacent to the juncture of the link part 67 and the handle part 69.

Means are provided for limiting pivotal movement of the lever 63 relative to the link 61. Although various arrangements can be employed, in the disclosed construction, such means includes a flange or tab 71 which extends from the link 61 in position to engage an edge or portion 73 of the lever 63 to establish the braking position of the brake shoe 33 and to stop relative pivotal movement of the link 61 relative to the lever 63 shortly before the link 61 would travel over-center with respect to a line joining the pivotal connection 62 between the link 61 and the lever 63 and the pivotal connection 64 at the lower end of the lever 63 between the linkage 59 and the frame 13.

In order to adjustably locate the brake shoe 33 with respect to its distance from the axis of the idler wheel 23 when the brake shoe is in the braking position, and therefor to adjustably determine the amount of interfering engagement between the brake shoe 33 and the belt 17, means are provided for adjustably varying the length of the link part 67 of the lever 63. While various arrangements can be employed, in the disclosed construction, such means includes a bushing 79 connected to the lower end of the link part 67 and a stud or shaft 81 which is pivotally connected to the floor of the vehicle body or frame 13 at 64 and which includes a threaded portion extending through the bushing 79. Nuts 83 are threaded on the stud 81 at each of the ends of the bushing 79 so as to adjustably vary the overall length between the pivotal connection 64 of the stud 81 to the vehicle frame 13 and the pivot 62 between the link 61 and the lever 63.

In operation, the operator grasps the handle part 69 of the lever 63 and moves the lever 63 from a retracted position shown in dotted lines in FIG. 1 to the braking position shown in full lines in FIG. 1, thereby locating the brake shoe 33 in interfering engagement with the belt 17. Such engagement will prevent longitudinal movement of the belt 17 about the idler wheel 23 and will hold stationary the engaged belt 17.

In order to remove the brake shoe 33 from interfering engagement with the belt 17, the operator swings the handle part 69 of the lever 63 so as to rotate the link part 67 about its pivotal connection with the frame 13 in order to swing the brake shoe 33 away from the belt 17. Thus, it will be seen that there is provided a simple and economical arrangement for positively preventing lengthwise travel of the belt 17.

It is especially noted that the other belt 17 on the far side of FIG. 2 is not provided with a brake such as the mechanism just described.

Various of the features of the invention are set forth in the following claims:

What is claimed is:

1. A vehicle comprising a frame, a support mounted on said frame, a track trained, in part, about said support, a shoe, means for pivotally mounting said shoe on said frame for pivotal movement relative to a braking position and including an element connected to said shoe and rockable about a transverse axis fixed with respect to said frame, a lever pivotally connected to said frame, a link pivotally connected to said rockable element and to said lever, and means for limiting relative pivotal movement between said lever and said link to establish said shoe in said braking position.

2. A vehicle in accordance with claim 1 wherein said pivotal movement limiting means comprises a flange on one of the said link and said lever, and an edge on the other of said link and said lever adapted to be engaged by said flange.

3. A vehicle in accordance with claim 1 wherein said lever includes a link part pivotally connected at one end to said frame and a handle part extending from the other end of said link part at an angle thereto and wherein said link is pivotally connected to said lever adjacent to the juncture of said link part and said handle part.

4. A vehicle comprising a frame, a support mounted on said frame, a track trained, in part, about said support, a shoe, means for pivotally mounting said shoe on said frame for pivotal movement relative to a braking position and including an element connected to said shoe for common movement therewith and rockable about a transverse axis fixed with respect to said frame, a rigid lever including a link part pivotally connected at one end to said frame and a handle part extending from the other end of said link part, a link pivotally connected to said rockable element and to said lever adjacent to the junction of said link part and said handle part, and means for adjustably varying the length of said link part to regulate the relation of said shoe to said track when said shoe is in said braking position.

5. A vehicle in accordance with claim 4 wherein said link part length adjustment means includes a first link part portion and a second link part portion, and means for adjustably fixing said first and second link part portions to each other.

6. A vehicle in accordance with claim 5 wherein said means for adjustably fixing said first and second link part portions includes a bushing on one of the said first and second link part portions, and wherein the other of said link part portions includes a threaded section extending in said bushing and further including locking nuts on said threaded section at the opposite ends of said bushing.

7. A vehicle comprising a frame, an idler wheel mounted on said frame for rotation about a fixed axis, a first track trained, in part, about said idler wheel, and including longitudinally spaced and transversely arranged lugs, a shoe movable relative to a braking position in opposing relation to said idler wheel and with said track between said idler wheel and said shoe, said shoe including transversely arranged ribs engageable between said transversely arranged lugs on said track to prevent lengthwise movement of said track when said shoe is in said braking position, means on said frame for moving said shoe to and from said braking position including means for pivotally mounting said shoe on said frame for pivotal movement relative to said braking position and including an element rockable about a transverse axis fixed with respect to said frame, and a linkage comprising a lever including a link part having a first link part portion including a bushing and a second link part portion pivotally connected to said frame and including a threaded section extending in said bushing, and first link part locking nuts on said threaded section at the opposite ends of said bushing, whereby to adjustably vary the length of said link part so as to regulate the relation of said shoe to said track when said shoe is in said braking position, and a handle part extending from said link part and at an angle thereto, and a link pivotally connected to said rockable element and to said lever adjacent to the junction of said link part and said handle part, a flange on one of the said link and said lever, and an edge on the other of said link and said lever adapted to be engaged by said flange to limit relative pivotal movement between said lever and said link so as to establish said shoe in said braking position.

8. A vehicle in accordance with claim 7 and further including a second track supported by said frame for movement on the opposite side of said frame from said first track, said second track being without an externally applied brake.

* * * * *